Jan. 17, 1933.  F. DE C. SWEENEY  1,894,500

FISHING LURE

Filed July 12, 1932

Inventor

Floyd De C. Sweeney

By C. A. Snow & Co.

Attorneys.

Patented Jan. 17, 1933

1,894,500

UNITED STATES PATENT OFFICE

FLOYD DE C. SWEENEY, OF FRESNO, CALIFORNIA

FISHING LURE

Application filed July 12, 1932. Serial No. 622,149.

The device forming the subject matter of this application is a fishing lure, and one object of the invention is to provide a device of the class described which will have a life-like movement in the water, it being possible to have the device operate at a considerable distance below the surface of the water, or near to the surface of the water, as the fisherman may require.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In carrying out the invention, there is provided a body 1, which is made of any buoyant material, such as wood, cork, or the like.

Figure 2:
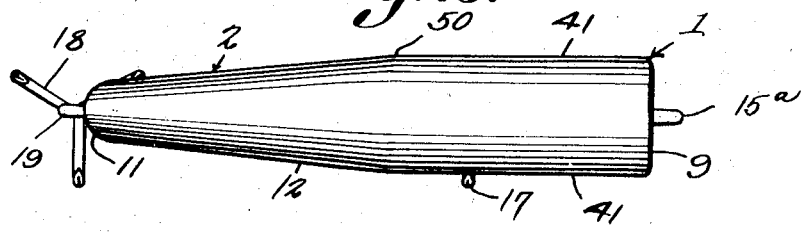
Fig. 2 is a top plan.

In top plan, as shown in Fig. 2, the body 1 is of the same width from its forward end to a point about midway between its ends, and designated by the numeral 50, but from the point 50 to its rear end, the body tapers, as shown at 2.

Figure 1:
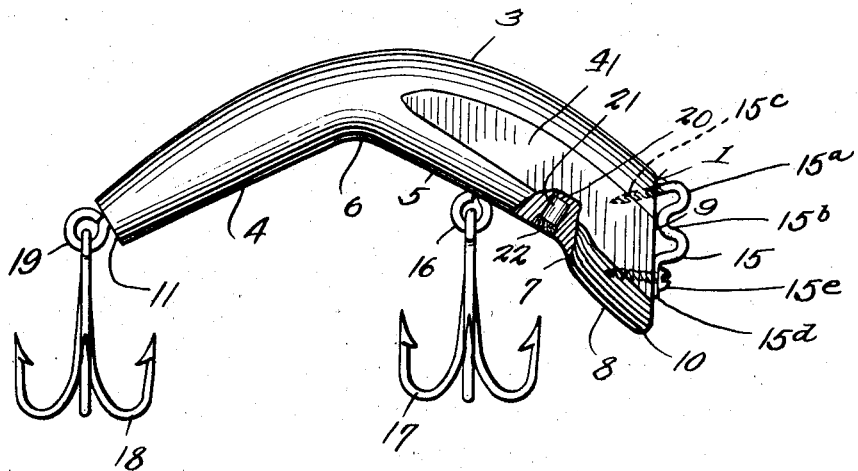
Fig. 1 shows in side elevation, a device constructed in accordance with the invention, parts being broken away.

In side elevation, as shown in Fig. 1, the body 1 also has a taper from its front end to its rear end. The upper edge of the body 1 is marked by the numeral 3, and curves continuously from the forward end of the body 1 to the rear end thereof. The lower edge of the body 1 does not have any such continuous curve. It comprises a straight lower rear edge 4, and a straight lower front edge 5, defining a pronounced angle 6 at a point midway between the ends of the body 1, the angle 6 being an obtuse angle. At the forward end of the front surface 5, the body has a transverse, forwardly inclined shoulder 7, merging into a downwardly and forwardly inclined edge 8, which may have a slight convexity. The front end surface 9 of the body 1 is disposed at an acute angle to the axis of the front part of the body 1, and with the edge shown at 8, forms a point 10 at the forward, lower extremity of the body. The rear end surface 11 of the body 1 is disposed at right angles to the axis of the rear portion of the body.

Figure 3:
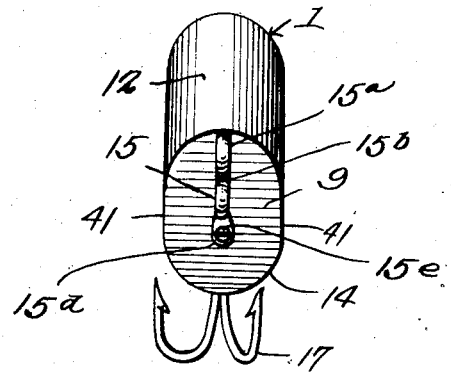
Fig. 3 is a front end elevation.

As to cross section, the body 1, generally stated, is of curved outline and somewhat higher than it is wide, as Fig. 3 will show. The upper surface 12 of the body 1 is convexed, and the lower surface 14 of the body is convexed also. The body, however, on its forward portion, has flat, parallel sides 41, which extend backwardly to a point near to the angle 6.

On the front end 9 of the body 1 is mounted a line fastener comprising outwardly projecting loops 15 and 15a, connected by an intermediate loop 15b. The loop 15a has a threaded end 15c, and the loop 15 has a flattened foot 15d, with a hole in it, the foot being disposed at an angle to the threaded end 15c. The end 15c of the loop 15a is threaded into the body 1 until the inwardly projecting loop 15b and the flattened foot 15d bear against the end 9 of the body 1, and, then, securing element 15e, such as a screw, is passed through the foot 15d, into the body 1, to hold the line fastener in place. Because the line fastener has the two loops 15 and 15a, the lure can be used either as an under-water lure or as a surface lure. When the line is made fast in the loop 15a, the lure works under water, but when the line is made fast in the loop 15, the lure will operate at the surface of the water. Since the end 15c of the loop 15a is threaded into the body 1, the loop 15b can be made to bear tightly against the end 9 of the body 1, and the line cannot slip from the loop 15a to the loop 15, or from the loop 15 to the loop 15a. When the securing device 15e is mounted in place through the foot 15d and in the body 1, the end 15c of the loop 15a cannot turn in the body 1, and the line fastener will remain in the position shown in Fig. 1, the loops 15a and 15 keeping their place one above the other, and the loop 15b being held in close contact with the end 9 of the body 1, as and for the purpose stated.

In the lower edge of the body 1, a little behind the shoulder 7, there is a recess 20, in which is mounted a weight 21, held in place by a plug 22, which may be a piece of cork, wood, a quantity of cement, or anything else.

In devices of the class described, considerable difficulty has been experienced heretofore, in causing the bait to have a life-like movement, because the lower edge of the body has been curved. In the present embodiment of the invention, the lower edge of the body is not curved, but comprises the edges 4 and 5, defining the angle 6. The shoulder 7 and the surface shown at 8, together with the weight 21, aid in causing the bait to have a life-like movement in the water, it being possible to locate the weight 21 wherever desired, if the weight is used. Some may prefer to omit it. Parts 4, 6, 5, 21, 7 and 8 constitute an important advance in devices of the general sort under consideration, and enhance the utility of the article. The general construction is such that the bait can be made to operate at different distances below the surface of the water. It will dive, move about, and, in general, conduct itself in such a way as to prove a very attractive lure.

Having thus described the invention, what is claimed is:

1. A fishing lure comprising a body which, in side elevation, tapers from its forward end toward its rear end, the body, in top plan, being of common width from its forward end to a place about midway between its ends, the body tapering, in top plan, from said place to its rear end, the upper edge of the body being convexed, and the lower edge of the body comprising front and rear straight portions defining an obtuse angle intermediate the ends of the body, there being a transverse shoulder in the lower part of the body, near the forward end of the body, and at the forward end of the said straight front portion, and there being a downwardly inclined surface leading from the shoulder to the forward end of the body and cooperating with the forward end of the body to form a point, the body being provided in its lower surface with a recess, located behind and closely adjacent to the shoulder, and a weight in the recess.

2. A fishing lure comprising a body which, in side elevation, tapers from its forward end toward its rear end, the body, in top plan, being of common width from its forward end to a place about midway between its ends, the body tapering, in top plan, from said place to its rear end, the upper edge of the body being convexed, and the lower edge of the body comprising front and rear straight portions defining an obtuse angle intermediate the ends of the body, there being a transverse shoulder in the lower part of the body, near the forward end of the body, and at the forward end of the said straight front portion, and there being a downwardly inclined surface leading from the shoulder to the forward end of the body and cooperating with the forward end of the body to form a point.

In testimony that I claim the foregoing as my own, I have hereto affixed my signature.

FLOYD DE C. SWEENEY.